(12) United States Patent
Lachambre et al.

(10) Patent No.: US 10,268,054 B2
(45) Date of Patent: Apr. 23, 2019

(54) EYEWEAR WITH INTERCHANGEABLE ORNAMENT MOUNTING SYSTEM, ORNAMENT RECEIVING SYSTEM FOR EYEWEAR AND METHOD OF MOUNTING ORNAMENTS TO EYEWEAR

(71) Applicant: 9023-2349 QUÉBEC INC., Ste-Julie (CA)

(72) Inventors: Alain Lachambre, Ste-Julie (CA); Sherrill Nettleton, Markham (CA)

(73) Assignee: 9023-2349 QUEBEC INC., Ste-Julie, Quebec (CA)

( * ) Notice: Subject to any disclaimer, the term of this patent is extended or adjusted under 35 U.S.C. 154(b) by 0 days.

(21) Appl. No.: 14/650,222

(22) PCT Filed: Aug. 15, 2013

(86) PCT No.: PCT/CA2013/050628
§ 371 (c)(1),
(2) Date: Jun. 5, 2015

(87) PCT Pub. No.: WO2014/085921
PCT Pub. Date: Jun. 12, 2014

(65) Prior Publication Data
US 2015/0316791 A1     Nov. 5, 2015

Related U.S. Application Data

(60) Provisional application No. 61/733,580, filed on Dec. 5, 2012.

(51) Int. Cl.
G02C 5/14      (2006.01)
G02C 5/22      (2006.01)
G02C 11/02     (2006.01)

(52) U.S. Cl.
CPC .............. G02C 11/02 (2013.01); G02C 5/146 (2013.01); G02C 5/22 (2013.01)

(58) Field of Classification Search
CPC .......... G02C 11/02; G02C 5/143; G02C 5/14; G02C 5/146; G02C 5/22
(Continued)

(56) References Cited

U.S. PATENT DOCUMENTS 2,629,196 A    2/1953   Splaine
2,766,541 A    10/1956  Quinones et al.
(Continued)

FOREIGN PATENT DOCUMENTS

CA    2560133 A1    9/2007
CA    2671848 A1    7/2008
(Continued)

OTHER PUBLICATIONS

Extended European Search Report for corresponding European Patent Application No. 13861303.9 dated May 19, 2016, 7 pages.
(Continued)

*Primary Examiner* — Zachary W Wilkes
(74) *Attorney, Agent, or Firm* — Merchant & Gould P.C.

(57) ABSTRACT

An eyewear is configured to receive at least one interchangeable ornament. The eyewear includes at least one temple arm having a cavity defined therein and at least one ornament receiving member configured to removably receive at least one ornament thereon. The at least one ornament receiving member is detachably engageable with one of the at least one temple arm and extends into the cavity of the at least one temple arm when connected thereto. An ornament receiving system is adapted for the eyewear. A method mounts at least one ornament to an eyewear are also disclosed.

22 Claims, 4 Drawing Sheets

(58) Field of Classification Search
USPC ............ D16/335; 351/111, 121, 119, 51–52
See application file for complete search history.

(56) References Cited

U.S. PATENT DOCUMENTS

| | | | |
|---|---|---|---|
| 4,877,320 A | 10/1989 | Holden | |
| 5,033,836 A | 7/1991 | Aoyama | |
| 5,161,234 A | 11/1992 | Nitta | |
| 5,414,948 A | 5/1995 | Kudo | |
| 5,583,584 A | 12/1996 | Friedman | |
| 5,627,607 A | 5/1997 | Grau | |
| 6,381,807 B1* | 5/2002 | Hsu | G02C 5/2227 351/123 |
| 6,427,487 B1 | 8/2002 | Morgan | |
| 6,520,635 B1 | 2/2003 | Ignatowski | |
| 6,863,394 B1 | 3/2005 | Nelson et al. | |
| 6,898,950 B2 | 5/2005 | Masina et al. | |
| 7,007,507 B2 | 3/2006 | Enevoldsen | |
| 7,524,052 B2 | 4/2009 | Esses | |
| 7,530,688 B2* | 5/2009 | Grogan | G02C 11/02 351/121 |
| 7,559,645 B2 | 7/2009 | Cohen | |
| 7,585,069 B2* | 9/2009 | Wilson | G02C 11/02 351/51 |
| 7,677,721 B2 | 3/2010 | Siu | |
| 7,914,143 B2 | 3/2011 | Heim | |
| 7,938,533 B2* | 5/2011 | Shapiro | G02C 3/04 351/112 |
| 8,123,351 B2 | 2/2012 | Moritz et al. | |
| 8,201,938 B2 | 6/2012 | Rhee | |
| 2006/0187404 A1 | 8/2006 | Ifergan | |
| 2009/0096982 A1 | 4/2009 | Heim | |
| 2010/0002186 A1* | 1/2010 | Zelman | G02C 11/02 351/52 |
| 2011/0080555 A1 | 4/2011 | Chow | |
| 2011/0102733 A1 | 5/2011 | Moritz et al. | |
| 2012/0075571 A1 | 3/2012 | Silver | |
| 2014/0125939 A1* | 5/2014 | Ho | G02C 11/02 351/52 |

FOREIGN PATENT DOCUMENTS

| | | |
|---|---|---|
| FR | 2950159 A3 | 3/2011 |
| FR | 2 969 322 A1 | 6/2012 |
| GB | 500244 | 2/1939 |
| JP | 11-287969 A | 10/1999 |
| JP | 2001-013469 A | 1/2001 |
| WO | 2011023859 A1 | 3/2011 |
| WO | 2012093986 A1 | 7/2012 |
| WO | 2012117369 | 9/2012 |

OTHER PUBLICATIONS

Dilem, Frames with interchangeable temples, online, http://www.dilem.fr/en/ (2013).

\* cited by examiner

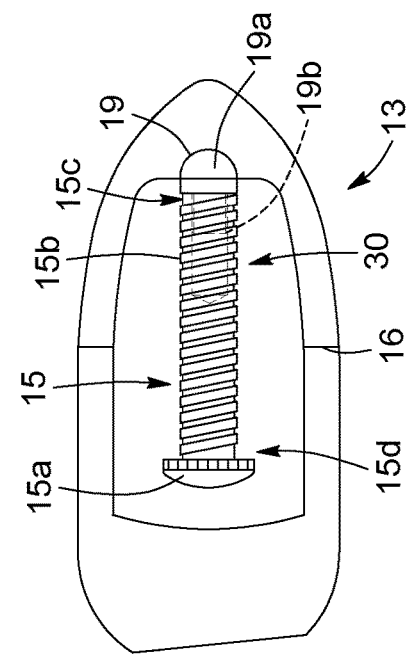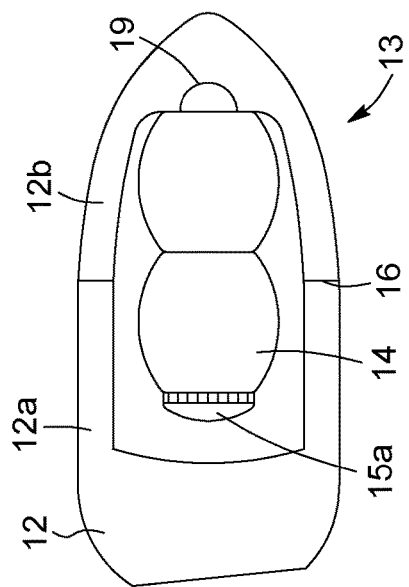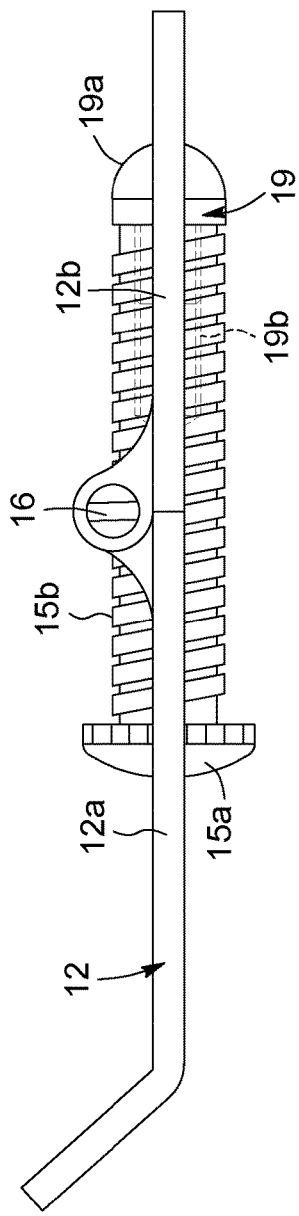

EYEWEAR WITH INTERCHANGEABLE ORNAMENT MOUNTING SYSTEM, ORNAMENT RECEIVING SYSTEM FOR EYEWEAR AND METHOD OF MOUNTING ORNAMENTS TO EYEWEAR

CROSS-REFERENCE TO RELATED APPLICATIONS

This application is a National Stage Application of PCT/CA2013/050628, filed Aug. 15, 2013, which claims priority under 35 USC § 119(e) of U.S. provisional patent application 61/733,580 filed on Dec. 5, 2012, and which applications are incorporated herein by reference. To the extent appropriate, a claim of priority is made to each of the above disclosed application.

TECHNICAL FIELD OF THE INVENTION

The present invention relates to the field of eyewear. More particularly, it relates to eyewear having an interchangeable ornament mounting system, to a system for receiving interchangeable ornaments for eyewear and to a method for mounting interchangeable ornaments to such eyewear.

BACKGROUND

It has been found that there is currently an increasing demand for unique, fashion statement eyewear, i.e. eyewear offering a more distinctive look that helps to reflect the wearer's own personality and allows the wearer to meet the fashion challenge in order to stay up to date with the ever changing clothing and accessory industries. In many cases, the customers' desire for individuality and creativity has resulted in a change in consumers' buying habit. Many customers now want to be able to control and develop their own creations; they have become the "creator or designer".

Over the last few years, charm link bracelet companies have been successful in addressing and satisfying this creator or designer type of customer by developing a concept where the beads and charms can be interchanged and uniquely combined with different color and texture materials, such that the customers can create their very own designer piece of jewelry. However, the availability of interchangeable charm link system has been limited to the jewelry field of bracelets, necklaces and earrings, and the interchangeable charm link system has therefore been isolated to the wrists, necks and ears. This specialized industry has experienced an overall success and has expanded its influence throughout the world. This expansion, however, has been limited to the jewelry accessory market.

Over time, several design of eyewear allowing ornaments to be mounted thereto, fixedly or interchangeably, were proposed. However, known eyewear allowing ornaments to be mounted thereto generally tend to restrict the types of ornaments or decorative items that can be mounted thereto and/or the possible combination or ornament that can be made, thereby limiting the creativity of the customer.

In view of the above, there is a need for improved eyewear with an interchangeable ornament mounting system, an ornament receiving system for eyewear and/or a method for interchangeably mounting ornaments to eyewear, which would be able to overcome or at least minimize some of the above-discussed prior art concerns.

BRIEF SUMMARY

According to a general aspect, there is provided an eyewear comprising: at least one temple arm having a cavity defined therein; and at least one ornament receiving member detachably engageable with one of the at least one temple arm to removably receive at least one ornament thereon and extending into the cavity of the at least one temple arm when engaged therewith.

In an embodiment, the at least one temple arm comprises a pivoting axis intersecting with the ornament receiving member when engaged therewith and allowing the at least one temple arm to be pivoted between an operative configuration and a closed configuration. The at least one ornament receiving member when engaged with the at least one temple arm can pivot simultaneously therewith about the pivoting axis. The at least one ornament receiving member can extend substantially perpendicular to the pivoting axis and parallel to the at least one temple arm when engaged therewith.

In an embodiment, the cavity comprises a through hole defined in the at least one temple arm.

In an embodiment, the at least one ornament receiving member is threadably engageable with the at least one temple arm. The at least one ornament receiving member can comprise a threaded inner channel and the at least one temple arm comprises at least one threaded securing member, the at least one threaded securing member being threadably engageable in the threaded inner channel.

In an embodiment, the at least one ornament receiving member comprises an outer wall threaded along at least a section thereof.

In an embodiment, the at least one ornament receiving member is visible from an inner side and an outer side of the at least one temple arm when engaged therewith.

According to another general aspect, there is provided an ornament receiving system for an eyewear having at least one temple arm with a cavity defined therein. The ornament receiving system comprises: at least one ornament receiving member detachably engageable with the at least one temple arm, the at least one ornament receiving member extending into the cavity of the at least one temple arm when engaged therewith; and at least one ornament removably engageable with the at least one ornament receiving member.

In an embodiment, the at least one temple arm further comprises an extension member securable to a frame front of the eyewear, the extension member comprising a pivoting axis allowing the at least one temple arm to be pivoted between an operative configuration and a closed configuration, the ornament receiving member intersecting with the pivoting axis when engaged the at least one temple arm.

In an embodiment, the at least one ornament receiving member is threadably engageable with the at least one temple arm. The ornament receiving system can further comprise at least one threaded securing member secured to a respective one of the at least one temple arm and the at least one ornament receiving member can comprise a threaded inner channel, the at least one threaded securing member being threadably engageable in the threaded inner channel.

In an embodiment, the at least one ornament receiving member comprises an outer wall threaded along at least a section thereof.

In an embodiment, the at least one ornament is visible from an inner side and an outer side of the at least one temple arm, when mounted to the at least one ornament receiving member engaged with the at least one temple arm.

In an embodiment, the at least one ornament is spaced-apart from a peripheral wall of the cavity of the at least one temple arm, when mounted to the at least one ornament receiving member engaged with the at least one temple arm.

According to still another general aspect, there is provided a method of mounting at least one ornament to an eyewear comprising a frame front and at least one temple arm having an ornament receiving member detachably engaged therewith. The method comprises the steps of: disengaging the ornament receiving member from a respective one of the at least one temple arm; mounting the at least one ornament onto the ornament receiving member by inserting the ornament receiving member into an inner channel of the at least one ornament; and engaging the ornament receiving member with the respective one of the at least one temple arm.

In an embodiment, the method further comprises configuring the respective one of the at least one temple arm in a closed configuration where the ornament receiving member extends substantially parallel to the frame front before disengaging the ornament receiving member from the respective one of the at least one temple arm.

In an embodiment, disengaging the ornament receiving member from and engaging the ornament receiving member with the respective one of the at least one temple arm respectively comprise unscrewing and screwing the ornament receiving member with the respective one of the at least one temple arm.

According to a further general aspect, there is provided an eyewear comprising: a frame front; at least one temple arm mounted to the frame front and comprising a pivoting axis; and at least one ornament receiving member detachably engageable with the at least one temple arm to removably receive at least one ornament thereon with the at least one ornament receiving member intersecting with the pivoting axis when engaged with the at least one temple arm.

In an embodiment, the at least one ornament receiving member extends substantially parallel to the temple arm and perpendicular to the pivoting axis.

In an embodiment, the at least one temple arm is pivotable about the pivoting axis between an operative configuration wherein the at least one temple arm and the at least one ornament receiving member when engaged therewith extend substantially perpendicular to the frame front and a closed configuration wherein the at least one temple arm and the at least one ornament receiving member when engaged therewith extend substantially parallel to the frame front.

In an embodiment, the at least one temple arm comprises an extension member secured to the frame front and having a cavity defined therein, the at least one ornament receiving member extending in the cavity when engaged with the at least one temple arm. The cavity can comprise a through hole defined in the extension member.

In an embodiment, the at least one ornament receiving member is threadably engageable with the at least one temple arm. The at least one ornament receiving member can comprise a threaded inner channel and the at least one temple arm comprises at least one threaded securing member, the at least one threaded securing member being threadably engageable in the threaded inner channel.

In an embodiment, the at least one ornament receiving member comprises an outer wall threaded along at least a section thereof.

In an embodiment, the at least one ornament receiving member is visible from an inner side and an outer side of the at least one temple arm when engaged therewith.

In an embodiment, the at least one ornament receiving member is engageable with the at least one temple arm rearwardly of the pivoting axis and extends forwardly thereof.

According to still another general aspect, there is provided an eyewear comprising: a frame front; at least one temple arm extending from the frame front and having an inner side and an outer side; and at least one ornament receiving member detachably engageable with one of the at least one temple arm, the at least one ornament receiving member being visible from the inner side and the outer side of the at least one temple arm when engaged therewith.

According to still another general aspect, there is provided an ornament receiving system for an eyewear having at least one temple arm having an inner side and an outer side, the ornament receiving system comprising: at least one ornament receiving member detachably engageable with the at least one temple arm and being visible from the inner side and the outer side of the temple arm when engaged therewith; and at least one ornament engageable with the ornament receiving member.

According to still another general aspect, there is provided a method of mounting at least one ornament to an eyewear comprising a frame front and an ornament receiving member detachably engageable to a temple arm, the method comprising the steps of: disengaging at least a section of an ornament receiving member from the temple arm; mounting at least one ornament onto the ornament receiving member; and engaging the at least section of the ornament receiving member with the corresponding temple arm.

According to still another general aspect, there is provided an eyewear comprising: a frame front; at least one temple arm extending from the frame front and having an inner side and an outer side; and at least one ornament receiving member mounted to the at least one temple arm, the at least one ornament receiving member having a first section and a second section detachably engageable with the first section, the first and second sections being disengageable for mounting and dismounting at least one ornament to the at least one ornament receiving member, the at least one ornament receiving member being visible from the inner side and the outer side of the at least one temple arm when engaged therewith.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 3 is an enlarged side elevation view of the ornament mounting system shown in FIG. 2, with the ornament removably mounted thereon;

FIG. 4 is an enlarged side elevation view of the ornament mounting system shown in FIG. 1, without ornament mounted thereon;

FIG. 5 is a top plan view of the ornament mounting system shown in FIG. 4;

DETAILED DESCRIPTION

In the following description, the same numerical references refer to similar elements. The embodiments, geometrical configurations, materials mentioned and/or dimensions shown in the figures or described in the present description are preferred embodiments only, given solely for exemplification purposes.

Moreover, although the embodiments of the eyewear with an interchangeable ornament mounting system and corresponding parts thereof consist of certain geometrical configurations as explained and illustrated herein, not all of these components and geometries are essential to the invention and thus should not be taken in their restrictive sense. It is to be understood, as also apparent to a person skilled in the art, that other suitable components and cooperation thereinbetween, as well as other suitable geometrical configurations, may be used for the eyewear with an interchangeable ornament mounting system, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
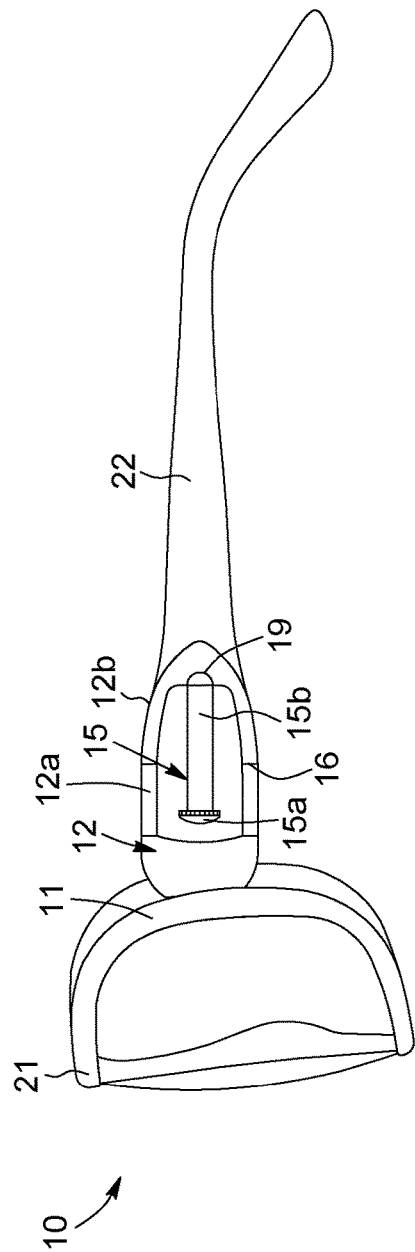
FIG. 1 is a side elevation view of an eyewear including an ornament mounting system in accordance with an embodiment.
Figure 2:
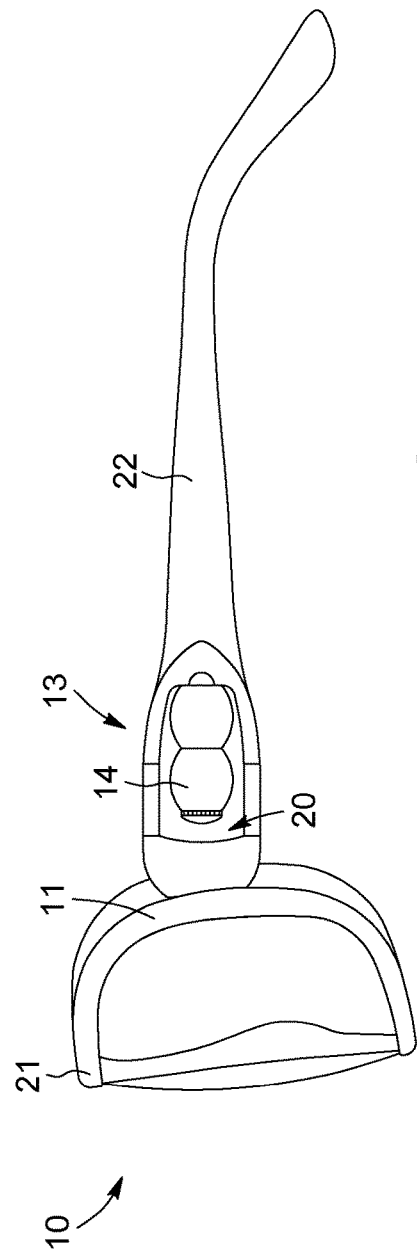
FIG. 2 is a side elevation view of the eyewear including the ornament mounting system shown in FIG. 1 with an ornament removably mounted thereon.
Figure 7:
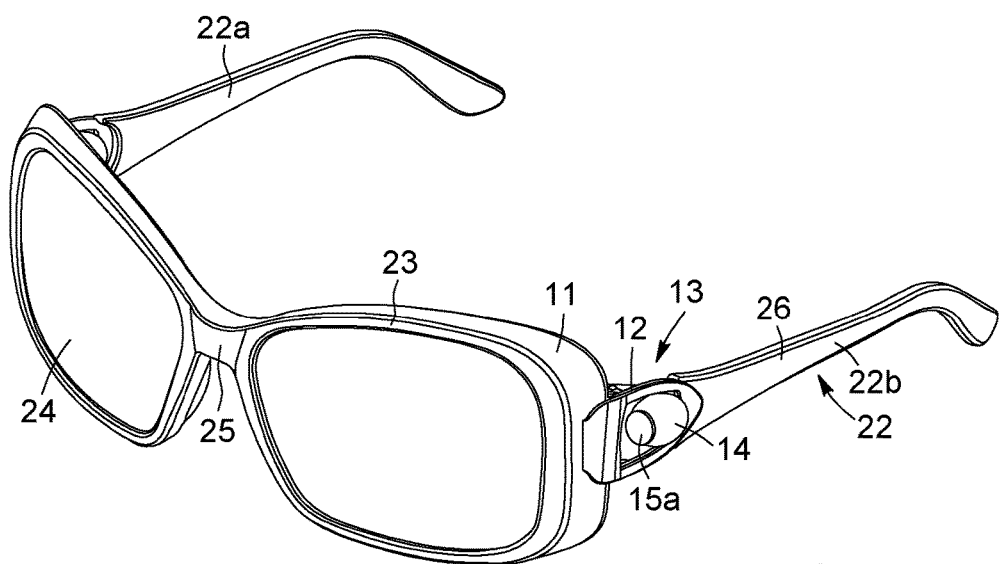
FIG. 7 is a perspective view of the eyewear including the ornament mounting system shown in FIG. 2 with a different ornament removably mounted thereon.

Referring generally to FIGS. 1, 2, and 7, in accordance with one embodiment, there is provided an eyewear 10 having an eyewear frame 11. It will be understood that the eyewear 10 can be of different types such as, for example and without being limitative, eyeglasses, sunglasses, or the like and may or may not include corrective lenses.

The eyewear frame 11 includes a frame front 21 and two temple arms 22, mounted to the frame front 21 and extending therefrom. Each temple arm 22 is formed of an extension member 12 connected to the frame front 21 and a rear section 26 connected to the extension member 12. Each one of the temple arms 22 also has an inner side 22a and an outer side 22b. When the eyewear 10 is worn by a user, the inner side 22a of each temple arm 22 is facing the head of the user, while the outer side 22b faces away from the head of the user.

In the illustrated embodiment, the frame front 21 includes eye wires (or rims) 23 connected to the extension members 12 of the temple arms 22 and surrounding two lenses 24. The eye rims 23 are connected together by a bridge 25. In alternative embodiment (not shown), the eye rims 23 may also be connected by a top bar. It will be understood that, in alternative embodiments, the shape and/or style of the frame front 21 and the rear section 26 of the temple arms 22 could differ from that of the illustrated embodiment. Moreover, in an alternative embodiment, the eyewear 10 can also have a rimless glass front portion, where each temple arm 22 is connected directly to the corresponding lens 24.

Now referring to FIGS. 1 to 4, the eyewear 10 further includes an ornament mounting system 13 included within the temple arms 22 in the extension member 12, between the frame front 21 and the rear section 26 of the temple arms 22. The ornament mounting system 13 includes a detachable rod system 30 which can support one or more ornaments 14, as will be described in more details below. In an embodiment, the one or more ornament 14 includes an internal channel to be selectively engageable and disengageable with the ornament mounting system 13.

In the course of the present description, the term "ornament" will be used in the singular, however one skilled in the art will understand that more than one ornament 14 could be mounted on the ornament mounting system 13.

One skilled in the art will also understand that even though the eyewear 10 shown in the appended Figures includes an ornament mounting system 13 associated to each one of the temple arms 22, in an alternative embodiment only one of the temple arms 22 could be provided with such an ornament mounting system 13.

In the course of the present description, only one of the ornament mounting systems 13 will be described. However, one skilled in the art will understand that the description applies to the ornament mounting systems 13 provided on either one or both temple arms 22.

As mentioned above, in the embodiment shown in FIGS. 1 and 2, each ornament mounting system 13 is part of the extension member 12 which has a first end secured to the frame front 21 and a second end engaged with the rear section 26 of the respective one of the temple arms 22. The extension member 12 includes a cavity 20 defined therein. In the illustrated embodiment, the cavity 20 forms an open space (or through hole) in the extension member 12. The extension member 12 is divided into a front section 12a and a rear section 12b. The front section 12a includes the end attached to the frame front 21 and the rear section 12b includes the end attached to the rear section 26 of the corresponding temple arm 22.

As can be better seen in FIGS. 1, 2 and 5, in the illustrated embodiment, the front section 12a and the rear section 12b of the extension member 12 are pivotally connected together through a hinge 16 vertically aligned with the cavity 20. In other words, the hinge 16 is positioned such that it intersects with the cavity 20 and separates portions of the cavity 20 when the front section 12a and the rear section 12b are pivoted relative to one another. The hinge 16 defines a pivoting axis allowing the temple arms 22 to be configured in a closed (inoperative) configuration or an open (operative) configuration. In the closed configuration, the temple arms 22 extend substantially parallel to the frame front 21. This configuration is useful for storage and transport purposes. In the operative configuration, the temple arms 22 extend substantially perpendicular to the frame front 21 and allow the eyewear 10 to be worn by a user. One skilled in the art will understand that the two temple arms 22 may be moved between the closed configuration and the open configuration simultaneously or successively.

One skilled in the art will understand that, in alternative embodiments, the shape, size and style of the extension member 12 can vary from the one shown in the appended Figures. In an embodiment, the extension member 12 is made of metal or metal alloys. However, it is appreciated that, in alternative embodiments, the extension member 12 can be made of any other suitable material.

As mentioned above, the ornament mounting system 13 includes the detachable rod system 30 with an ornament receiving member 15. The ornament receiving member 15 is detachably engageable with the extension member 12 such as to extend into the cavity 20. In the embodiment shown, the ornament receiving member 15 is detachably engaged with the rear section 12b of the extension member 12 and extends towards the front section 12a. One skilled in the art will understand that, in an alternative embodiment (not shown), the ornament receiving member 15 could however be detachably engaged with the front section 12a of the extension member 12.

It will be understood that, in the illustrated embodiment where the ornament receiving member 15 is engaged with the rear section 12b of the extension member 12, the ornament receiving member 15 is pivoted with respect to the frame front 21 when the temple arm 22 is configured in the closed configuration. In this configuration, the ornament receiving member 15 therefore extends substantially parallel to the frame front 21 and projects longitudinally from the temple arm 22. The longitudinal projection of the ornament receiving member 15 from the temple arm 22 is advantageous in that it allows easy access to the ornament receiving member 15 for users wishing to interchange ornaments 14, as will be described below.

Referring to FIGS. 3 to 5 and 8, in the embodiment shown, the ornament receiving member 15 comprises an elongated stem 15b (or rod) and a head 15a. The elongated stem 15b has a proximal end 15c securable to the rear section 12b of the extension member 12 and a distal end 15d adjacent to the head 15a. The elongated stem 15b is configured to receive thereon interchangeable ornament 14 having an inner channel formed therein. The head 15a is provided at the distal end 15d of the stem 15b and maintains the ornament 14 engaged therewith, as will be described in more details below.

The proximal end 15c of the elongated stem 15b is provided with a mounting assembly which allows the ornament receiving member 15 to be removably secured to the extension member 12. In the illustrated embodiment, the elongated stem 15b of the ornament receiving member 15 comprises an elongated channel 18 defined therein and extending inwardly from the proximal end 15c thereof. In an embodiment, an inner wall of the elongated inner channel 18 is threaded such that the ornament receiving member 15 is threadably mountable to the rear section 12b of the extension member 12.

In the embodiment shown, the ornament mounting system 13 further comprises a securing member embodied by a male member 19 having a head 19a engaged in the rear section 12b of the extension member 12 and a stem 19b projecting therefrom. In an embodiment, the stem 19b has a threaded outer wall.

In an embodiment, the male member 19 is connected to the rear section 12b of the extension member 12. The male member 19 may be permanently secured to the rear section 12b by known securing means. The ornament receiving member 15 can be selectively engaged and disengaged with the male member 19 by inserting the stem 19b of the male member 19 into the elongated inner channel 18 of the ornament receiving member 15. Engagement of the ornament receiving member 15 with the male member 19 can be carried out by rotating the ornament receiving member 15 with respect to the male member 19.

As previously described, the ornament receiving member 15 is pivoted with respect to the frame front 21 when the temple arm 22 is configured in the closed configuration. Thus, for selectively mounting ornament 14 with the ornament mounting system 13, the temple arm 22 is generally configured in the closed configuration to provide easy access to the ornament receiving member 15. The ornament receiving member 15 can subsequently be disengaged from the male member 19 by rotating the ornament receiving member 15 with respect to the male member 19, i.e. the ornament receiving member 15 is unscrewed from the male member 19. Once the ornament receiving member 15 has been disengaged from the male member 19, the ornament 14 can be slid on the stem 15b of the ornament receiving member 15. The ornament receiving member 15 can then be re-engaged with the male member 19 by engaging the stem of the male member 19 into the internally threaded elongated channel 18 of the ornament receiving member 15 by relative rotation, i.e. the ornament receiving member 15 is screwed onto the male member 19. The temple arm 22 can then be configured in the open configuration and the eyewear can be worn with ornament 14 mounted thereon.

The same steps can be carried out when the user wants to remove or interchange the ornament 14 mounted to the ornament mounting system 13.

It will be understood that pivoting the temple arm 22 in the closed configuration facilitates access to the ornament receiving member 15 for engagement and disengagement of the latter with the rear section 12b of the extension member 12, but that however, it is possible to disengage the ornament receiving member 15 from the rear section 12b of the extension member 12 even when the temple arm 22 is in the open configuration. Advantageously, in the illustrated embodiment, the ornament receiving member 15 can be screwed and unscrewed manually without use of tools.

In the embodiment shown, the outer peripheral wall of the stem 15b of the ornament receiving member 15 is threaded, i.e. the stem 15b is a treaded cylindrical rod. Thus, ornament 14 having an internally threaded inner channel can be engaged by rotation with the ornament receiving member 15. Such a treaded connection between the stem 15b and the ornament 14 prevents displacement of the ornament 14 along the stem 15b when engaged therewith, i.e. it maintains the detachable ornament 14 in place when the eyewear 10 is worn. In alternative embodiments, other features can be used to prevent displacement or sliding of the ornament 14 along the stem 15b.

In an embodiment, the diameter of the head 15a of the ornament receiving member 15 is larger than the diameter of the inner channel defined in the ornament 14 mounted on the ornament receiving member 15 in order to prevent the ornament 14 being removed from the distal end 15d of the stem 15b.

Figure 8:
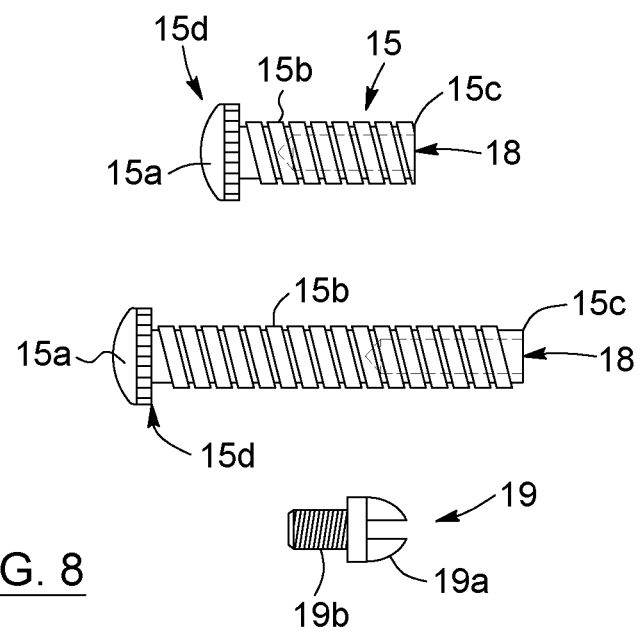
FIG. 8 is a side elevation view of rod system components of the ornament mounting system.

In an embodiment, and as can easily be seen in FIG. 8, more than one ornament receiving member 15 can be available to the user. As can be seen, each one of the ornament receiving members 15 may be characterized by a different diameter, length and/or thread pattern such as to allow for one of more ornament 14 to be mounted thereto. Furthermore, the length and diameter of the ornament receiving member 15 can vary depending on the type of ornament 14 to be mounted thereon (see FIG. 6 for an example of different ornament 14 mounted on a temple arm 22). It will however be understood that, in order for the different ornament receiving members 15 to all be mountable to the rear section 12b of the extension member 12, the inner channels 18 of all the ornament receiving members 15 should have a similar configuration.

In alternative embodiments, the ornament receiving member 15 can be removably securable to the temple arm 22 by other means than the threaded screw assembly described above. For example and without being limitative, in an alternative embodiment, the ornament receiving member 15 and the temple arm 22 can include complementary magnetic members which are detachably engageable together. Furthermore, in an embodiment, the ornament receiving member 15 can be directly engaged with the temple arm 22. For instance, the ornament receiving member can be engaged directly in a threaded aperture defined in the temple arm 22.

In an alternative embodiment, only a section of the ornament receiving member 15 can be detachably engageable with the remaining section of the ornament receiving member 15. For example and without being limitative, in an embodiment, the head 15a of the ornament receiving member 15 can be detachably engageable with the stem 15b. Thus, for mounting or dismounting ornament 14 from the ornament receiving member 15, the head 15a may be disengaged from the stem 15b. Once the head 15a has been disengaged from the stem 15b, ornament 14 can be slid on the stem 15b of the ornament receiving member 15. The head 15a can then be re-engaged with the stem 15b to prevent ornaments from falling of the stem 15b.

For example and without being limitative, the ornament 14 that can be mounted to the ornament mounting system 13 includes any removable decorative jewelry accessory or accent such as charms, beads or other pieces of jewelry in various precious metals, precious stones, semiprecious stones, acrylic, polymers, metal alloys, glass, and natural materials such as wood and horns. The ornament 14 can be configured according to different geometric or non-geometric shapes. The ornament can include light emitting or electronic devices. As previously mentioned, in an embodiment, the ornament 14 includes an internal channel to be selectively engageable and disengageable with the stem 15b of the ornament receiving member 15.

Figure 6:
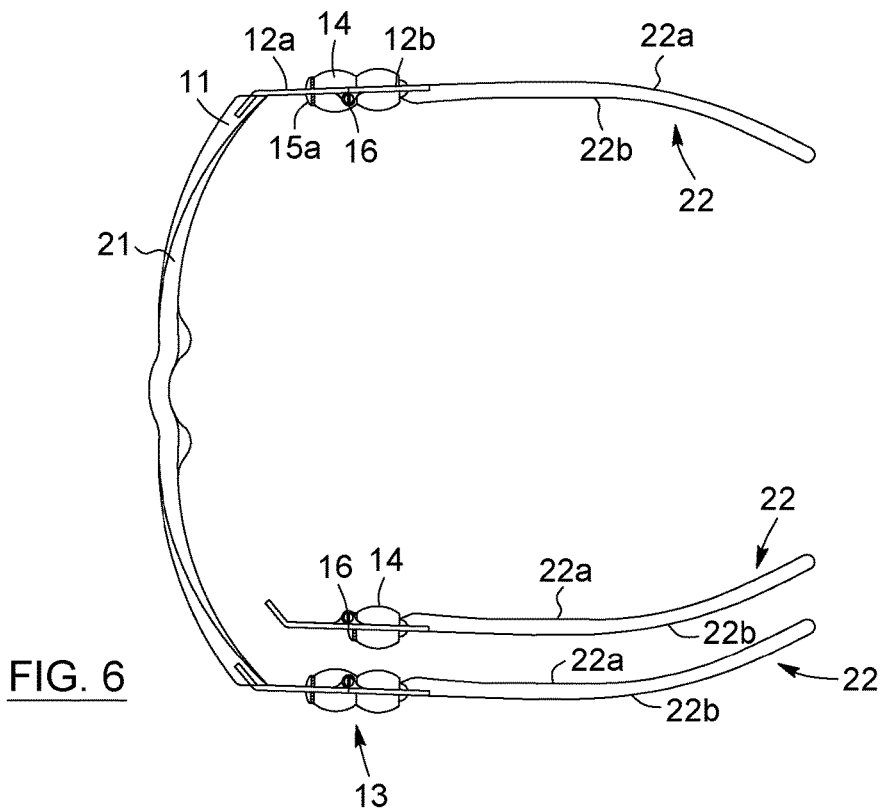
FIG. 6 is a top plan view of the eyewear including the ornament mounting system shown in FIG. 2 with an ornament removably mounted thereon and of an additional temple arm according to an embodiment where a different ornament is mounted thereon.

As shown in FIGS. 6 and 7, when engaged with the ornament mounting system 13, the ornament 14 is visible from the inner side 22a and the outer side 22b of the temple arms 22, given that the ornament receiving member 15 extends in the cavity 20. Furthermore, when engaged with the ornament mounting system 13, the ornament 14 does not contact the extension member 12, i.e. it is spaced-apart from a peripheral wall of the cavity 20 and therefore provides a substantially floating illusion.

Figure 9:
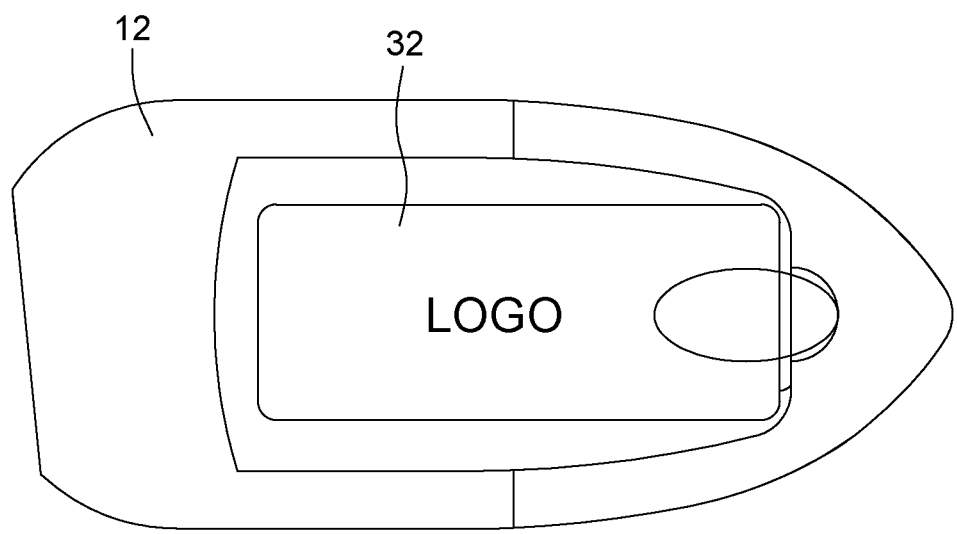
FIG. 9 is a side elevation view of the ornament mounting system, according to an embodiment where a decorative plate is mounted thereon.

Turning now to FIG. 9, there is shown that the ornament 14 can include a plaque 32 having a logo, a pattern or a design printed thereon or engraved therein. In an embodiment, the plaque 32 includes an internal channel, which can be threaded, which is engageable by rotation with the ornament receiving member 15. As shown in FIG. 9, the extension member 12 can include a recess in which a protuberance of the plaque 32 is inserted to prevent rotation thereof. Therefore, when the protuberance is inserted in the recess, the plaque 32 cannot rotate freely about the ornament receiving member 15. The plaque 32 can be used in replacement of the charms and or beads to give the eyewear 10 a more simple non-jewelry appearance. The shape and the material of the plaque 32 can vary. Amongst others, it allows for engraving, design or placement of a logo. Charms and or beads may be inserted in the plaque 32.

The above described ornament mounting system 13 incorporates interchangeable ornament 14 to an eyewear 10, thereby allowing eyewear 10 to be decorated with an ornament 14 that can be interchanged with ease. For example and without being limitative, the ornament mounting system 13 allows wearers to accessorize their eyewear 10 with an ornament 14 one day and on another day subsequently change the look of their eyewear 10 completely with a plain logo charm. The eyewear 10 including the ornament mounting system 13 enables wearers to show their own personal style, a way to express their individual style as well as allowing wearers to conveniently update, change or transform their eyewear 10.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. An eyewear comprising:
a frame front;
at least one temple arm pivotally mounted to the frame front and pivotable about a pivoting axis, the at least one temple arm having a cavity defined therein; and
at least one ornament receiving member having an elongated stem with an ornament receiving section, the elongated stem being mountable to and detachable from one of the at least one temple arm, the ornament receiving section of the elongated stem of the at least one ornament receiving member extending outwardly of the at least one temple arm when the elongated stem is mounted to the at least one temple arm, the ornament receiving section extending into the cavity of the at least one temple arm substantially parallel to the at least one temple arm and substantially perpendicular to the pivoting axis when the elongated stem is mounted to the at least one temple arm; and
at least one ornament having an inner channel extending therethrough, the at least one ornament being removably engageable onto the ornament receiving section of the elongated stem extending into the cavity by insertion of the ornament receiving section of the elongated stem into the inner channel of the at least one ornament wherein the at least one ornament surrounds the ornament receiving section of the elongated stem extending into the cavity when engaged with the ornament receiving section.

2. The eyewear of claim 1, wherein the pivoting axis intersects with the ornament receiving section of the elongated stem extending into the cavity when the elongated stem is mounted to the at least one temple arm, the pivoting axis allowing the at least one temple arm to be pivoted between an operative configuration and a closed configuration.

3. The eyewear of claim 2, wherein the at least one ornament receiving member when engaged with the at least one temple arm pivots simultaneously therewith about the pivoting axis.

4. The eyewear of claim 1, wherein the cavity comprises a through hole defined in the at least one temple arm.

5. The eyewear of claim 1, wherein the at least one ornament receiving member is threadably engageable with the at least one temple arm.

6. The eyewear of claim 5, wherein the at least one ornament receiving member comprises a threaded inner channel and the at least one temple arm comprises at least one threaded securing member, the at least one threaded securing member being threadably engageable in the threaded inner channel.

7. The eyewear of claim 1, wherein the at least one ornament receiving member comprises an outer wall threaded along at least a section thereof.

8. The eyewear of claim 1, wherein the at least one ornament receiving member is visible from an inner side and an outer side of the at least one temple arm when engaged therewith.

9. A method of mounting at least one ornament to the eyewear of claim 1, the method comprising the steps of:
   detaching the at least one ornament receiving member from a respective one of the at least one temple arm;
   mounting the at least one ornament onto the at least one ornament receiving member by inserting the elongated stem of the at least one ornament receiving member into the inner channel of the at least one ornament; and
   mounting the elongated stem of the at least one ornament receiving member with the respective one of the at least one temple arm.

10. The method of claim 9, further comprising configuring the respective one of the at least one temple arm in a closed configuration where the at least one ornament receiving member extends substantially parallel to the frame front before detaching the at least one ornament receiving member from the respective one of the at least one temple arm.

11. The method of claim 9, wherein detaching the at least one ornament receiving member from and mounting the at least one ornament receiving member with the respective one of the at least one temple arm respectively comprise unscrewing and screwing the at least one ornament receiving member with the respective one of the at least one temple arm.

12. The eyewear of claim 1, wherein the at least one temple arm extends rearwardly from the frame front and the elongated stem has a rear end mountable to and detachable from one of the at least one temple arm.

13. An eyewear for receiving at least one ornament having an inner channel, the eyewear comprising:
   a frame front;
   at least one temple arm pivotally mounted to the frame front and pivoting about a pivoting axis; and
   at least one ornament receiving member having an elongated stem mountable to and detachable from the at least one temple arm, the elongated stem having an ornament receiving section to removably receive the at least one ornament thereon with the ornament receiving section of the elongated stem being inserted and extending into the inner channel of the at least one ornament, the ornament receiving section of the elongated stem of the at least one ornament receiving member intersecting with and extending substantially perpendicular to the pivoting axis when engaged with the at least one temple arm and the ornament receiving section of the elongated stem extending substantially parallel to the at least one temple arm when engaged with the at least one temple arm.

14. The eyewear of claim 13, wherein the at least one temple arm is pivotable about the pivoting axis between an operative configuration wherein when the elongated stem is mounted to the at least one temple arm, the at least one temple arm and the ornament receiving section of the at least one ornament receiving member extend substantially perpendicular to the frame front and a closed configuration wherein when the elongated stem is mounted to the at least one temple arm, the at least one temple arm and the ornament receiving section of the at least one ornament receiving member extend substantially parallel to the frame front.

15. The eyewear of claim 13, wherein the at least one temple arm comprises an extension member secured to the frame front and having a cavity defined therein, the ornament receiving section of the elongated stem extending in the cavity when the elongated stem is mounted to the at least one temple arm.

16. The eyewear of claim 15, wherein the cavity comprises a through hole defined in the extension member.

17. The eyewear of claim 13, wherein the at least one ornament receiving member is threadably engageable with the at least one temple arm and comprises a threaded inner channel and the at least one temple arm comprises at least one threaded securing member, the at least one threaded securing member being threadably engageable in the threaded inner channel.

18. The eyewear of claim 13, wherein the at least one ornament receiving member comprises an outer wall threaded along at least a section thereof.

19. The eyewear of claim 13, wherein the at least one ornament receiving member is visible from an inner side and an outer side of the at least one temple arm when engaged therewith.

20. The eyewear of claim 13, wherein the at least one ornament receiving member is engageable with the at least one temple arm rearwardly of the pivoting axis and extends forwardly thereof.

21. The eyewear of claim 13, wherein the at least one temple arm has a rear section and a rear end of the elongated stem of the at least one ornament receiving member is mountable to and detachable from the rear section of the at least one temple arm with the elongated stem extending outwardly of the rear section of the at least one temple arm when engaged therewith.

22. An eyewear comprising:
   a frame front;
   at least one temple arm pivotally mounted to the frame front and pivotable about a pivoting axis, the at least one temple arm extending rearwardly from the frame front; and
   at least one ornament receiving member having an elongated stem with an ornament receiving section, the elongated stem having a rear end being mountable to and detachable from one of the at least one temple arm with the ornament receiving section of the elongated stem extending outwardly of the at least one temple arm when the rear end of the elongated stem is mounted to the at least one temple arm, the ornament receiving section extends substantially parallel to and aligned with the at least one temple arm and substantially perpendicular to the pivoting axis when the rear end of the elongated stem is mounted to the at least one temple arm; and
   at least one ornament having an inner channel extending therethrough, the at least one ornament being removably engageable onto the ornament receiving section of the elongated stem by insertion of the ornament receiving section of the elongated stem into the inner channel of the at least one ornament wherein the at least one ornament surrounds the ornament receiving section of the elongated stem when engaged with the ornament receiving section.

* * * * *